US012643450B2

(12) United States Patent
Aselage et al.

(10) Patent No.: US 12,643,450 B2
(45) Date of Patent: Jun. 2, 2026

(54) TRAY TABLE ASSEMBLY

(71) Applicant: Ford Global Technologies, LLC,
Dearborn, MI (US)

(72) Inventors: Austin Aselage, Royal Oak, MI (US);
Thomas J. Susko, Saint Clair Shores,
MI (US); Diego Lopez Lerma, Toluca
(MX)

(73) Assignee: Ford Global Technologies, LLC,
Dearborn, MI (US)

( * ) Notice: Subject to any disclaimer, the term of this
patent is extended or adjusted under 35
U.S.C. 154(b) by 374 days.

(21) Appl. No.: 18/412,797

(22) Filed: Jan. 15, 2024

(65) Prior Publication Data

US 2025/0229691 A1 Jul. 17, 2025

(51) Int. Cl.
B60N 3/00 (2006.01)
B60R 11/00 (2006.01)

(52) U.S. Cl.
CPC ...... B60N 3/002 (2013.01); B60R 2011/0005
(2013.01); B60R 2011/0084 (2013.01)

(58) Field of Classification Search
CPC ........... B60N 3/002; B60R 2011/0005; B60R
2011/0082; B60R 2011/0084; A47B
31/06; A47B 3/00
See application file for complete search history.

(56) References Cited

U.S. PATENT DOCUMENTS

| | | | | |
|---|---|---|---|---|
| 2,845,315 A | * | 7/1958 | McCoy | B60N 3/002 |
| | | | | 108/45 |
| 2,860,021 A | * | 11/1958 | Steele | B60N 3/002 |
| | | | | 108/45 |
| 5,161,028 A | * | 11/1992 | Kawata | B60K 35/60 |
| | | | | 345/87 |
| 11,384,571 B2 | | 7/2022 | Obita et al. | |
| 11,731,548 B2 | | 8/2023 | Park | |

* cited by examiner

*Primary Examiner* — Daniel J Colilla
(74) *Attorney, Agent, or Firm* — Vichit Chea; Price
Heneveld LLP

(57) ABSTRACT

A tray table assembly includes a carrier mechanism that
translates a tray coupled with the carrier mechanism. The
tray table assembly includes a latch assembly, the latch
assembly includes a multi-tiered rivet coupled with a
bracket. The latch assembly includes a biasing member
coupled with the multi-tiered rivet. A latch is coupled with
the multi-tiered rivet and the biasing member. The biasing
member is configured to bias the latch toward a biased-
closed position. The latch moves from the biased-closed
position to an open position in response to an applied force
above a target force. The latch in the open position selec-
tively engages the carrier mechanism to lock the carrier
mechanism.

20 Claims, 8 Drawing Sheets

TRAY TABLE ASSEMBLY

FIELD OF THE DISCLOSURE

The present disclosure generally relates to a tray table assembly for a vehicle. More specifically the present disclosure relates to a tray table assembly having an inertial latch.

BACKGROUND OF THE DISCLOSURE

Consumers of vehicles may desire a tray table to place things on top of. It would be desirable to enhance the characteristics of such a tray table in a vehicle.

SUMMARY OF THE DISCLOSURE

According to a first aspect of the present disclosure, a tray table assembly for a vehicle, the tray table assembly including a base. The tray table assembly including a track coupled with the base. The tray table assembly including a carrier mechanism slidably coupled with the track. The carrier mechanism including a platform coupled with the track, and a post coupled with the platform. The tray table assembly including a tray coupled with the platform. The tray table assembly including a motor coupled with the base, the motor configured to translate the carrier mechanism along the track between a holstered position and a deployed position. The tray table assembly including a latch assembly coupled with the base. The latch assembly including a bracket coupled with the base. The latch assembly including a multi-tiered rivet coupled with the bracket. The latch assembly including a biasing member coupled with the multi-tiered rivet. The latch assembly including a latch coupled with the multi-tiered rivet and the biasing member. The biasing member is configured to bias the latch toward a biased-closed position and the latch moves from the biased-closed position to an open position in response to an applied force above a target force. The latch in the open position selectively engages the post to lock the carrier mechanism in the holstered position.

Embodiments of the first aspect of the present disclosure can include any one or a combination of the following features:

- the latch assembly further includes a flange unitarily coupled with the bracket, the flange engaged with the biasing member, the flange selectively engaged with the latch;
- a body coupled with the multi-tiered rivet; a hook unitarily coupled with the body, the hook selectively engaged with the post; and a stopper unitarily coupled with the body, the stopper selectively engaged with the flange when the latch is in the open position;
- the multi-tiered rivet and the flange extend from the bracket toward the carrier mechanism;
- the stopper extends from the body toward the base;
- the body extends from the multi-tiered rivet toward the post of the carrier mechanism in the holstered position;
- the target force is about 6 g;
- the carrier mechanism includes a track receiver coupled with the platform, the track receiver defining a track-receiving aperture configured to receive the track;
- a reinforcement plate coupled with the base;
- a pulley coupled with the base; and a cable slidably coupled with the pulley, the cable coupled with the motor, the cable statically coupled with the platform, wherein the motor translates the carrier mechanism by driving the cable; and the track includes a tube, and wherein the carrier mechanism circumscribes the tube.

According to a second aspect of the present disclosure, a tray table assembly including a base having at least one locator feature extending therefrom. The tray table assembly including at least one track coupled with the base. The tray table assembly including a carrier mechanism slidably coupled with the at least one track. The carrier mechanism including a platform including at least one track receiver, the at least one track receiver coupled with the at least one track and a post extending from the platform toward the base. The tray table assembly including a tray coupled with the platform. The tray table assembly including a motor coupled with the base, the motor configured to translate the carrier mechanism from a holstered position to a deployed position. The tray table assembly including a latch assembly coupled with the base. The latch assembly including a bracket coupled with the base at the locator feature. The latch assembly including a multi-tiered rivet coupled with the bracket. The latch assembly including a biasing member coupled with the multi-tiered rivet. The latch assembly including a latch coupled to the multi-tiered rivet, the latch coupled with the biasing member. The biasing member biases the latch toward a closed position. The latch moves toward an open position in response to an applied force greater than a target force. The latch in the open position selectively engages the post to lock the carrier mechanism in the holstered position.

Embodiments of the second aspect of the present disclosure can include any one or a combination of the following features:

- the latch assembly further including a flange extending from the bracket proximal to the multi-tiered rivet, wherein the biasing member is coupled with the flange;
- the latch further including: a body coupled with the multi-tiered rivet, the body extending therefrom; a hook extending from the body distal from the multi-tiered rivet, the hook selectively engaged with post of the carrier mechanism in the holstered position when the latch is in the open position; and a stopper configured to engage the flange when the latch is in the open position;
- the target force ranges from about 6 g to about 10 g;
- the tray is coupled with the platform via a first plurality of fasteners;
- the bracket defining: a first set of apertures configured to receive the at least one locator feature; and a second set of apertures configured to receive a second plurality of fasteners to couple the bracket with the base; and
- the bracket slopes away from the base such that the multi-tiered rivet is spaced from the base.

According to a third aspect of the present disclosure, a vehicle including an instrument panel facing an interior cabin defined by the vehicle. The vehicle including a tray table assembly coupled with the instrument panel. The tray table assembly including a base coupled with the instrument panel. The base including a plurality of locator features extending away from the base. The tray table assembly including a plurality of tracks coupled with the base. The tray table assembly including a plurality of pulleys coupled with the base. The tray table assembly including a cable coupled with the plurality of pulleys. The tray table assembly including a carrier mechanism slidably coupled with the plurality of tracks. The carrier mechanism including a platform coupled with the cable. The carrier mechanism including a plurality of track receivers coupled with the platform, the plurality of track receivers defining a plurality of track-receiving apertures. The carrier mechanism including a post extending from the platform toward the base. The tray table assembly including a tray coupled with the platform via a first plurality of fasteners. The tray table assembly including a motor coupled with the base. The motor coupled with the cable, the motor configured to translate the carrier mechanism between a holstered position and a deployed position by driving the cable. The tray table assembly including a latch assembly coupled with the base. The latch assembly including a bracket defining a first set of apertures configured to receive the plurality of locator features and a second set of apertures configured to receive a second plurality of fasteners. The second plurality of fasteners coupled the bracket with the base. The latch assembly including a multi-tiered rivet coupled with the bracket. The latch assembly including a biasing member coupled with the multi-tiered rivet. The latch assembly including a flange unitarily coupled with the bracket. The latch assembly including a latch having a stopper. The latch coupled to the multi-tiered rivet, the latch coupled with the biasing member. The biasing member biases the latch toward a closed position. The latch moves toward an open position in response to an applied force greater than a target force. The stopper of the latch in the open position engages the flange. The latch in the open position selectively engages the post to lock the carrier mechanism in the holstered position.

Embodiments of the third aspect of the present disclosure can include any one or a combination of the following features:

The latch further including a body coupled with the multi-tiered rivet, the body extending therefrom; and a hook extending from the body distal from the multi-tiered rivet, the hook selectively engaged with post of the carrier mechanism in the holstered position when the latch is in the open position, wherein the stopper is proximal to the multi-tiered rivet, and wherein the stopper is distal from the hook.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
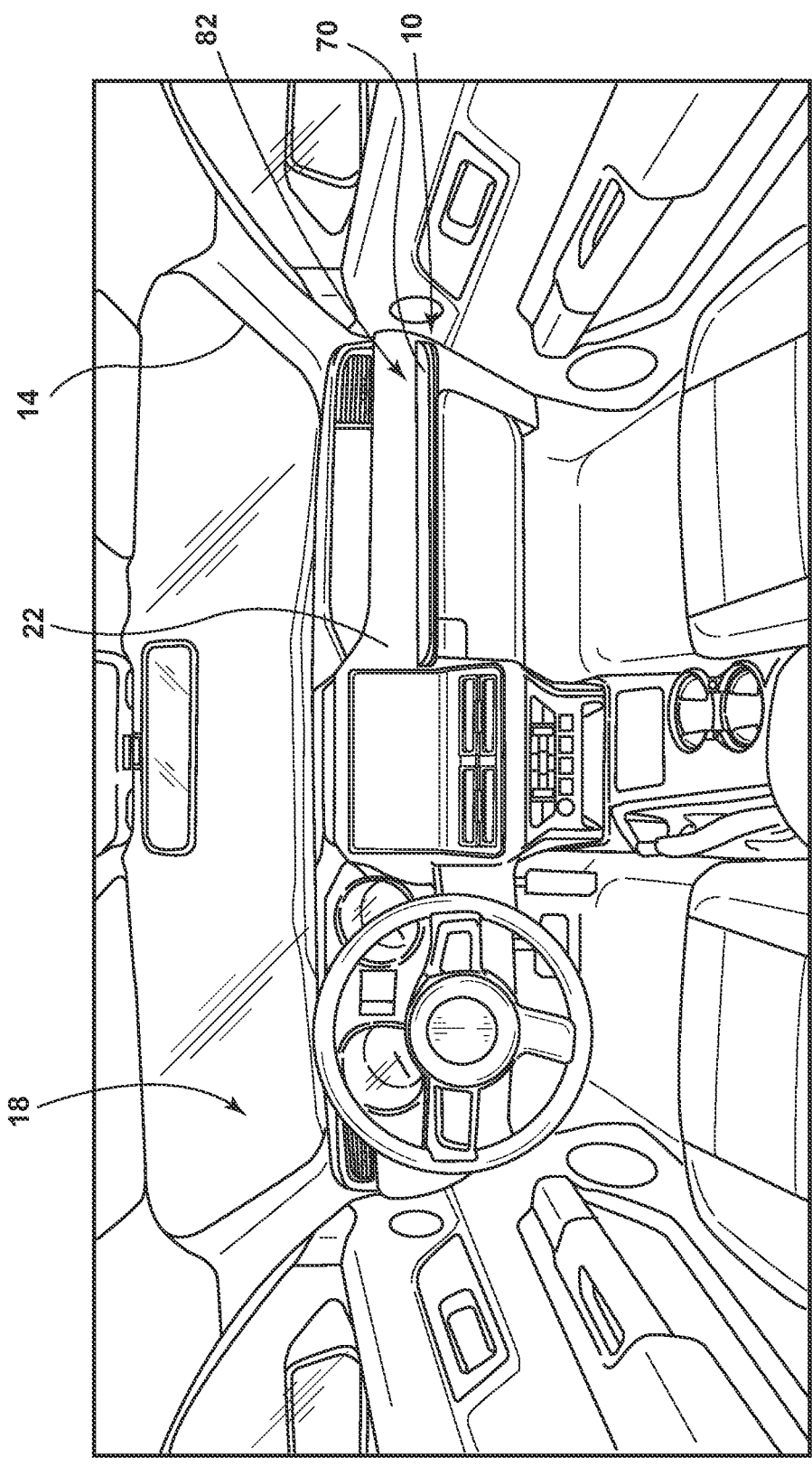
FIG. 1 is rear perspective view of an instrument panel in an interior cabin of a vehicle.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a tray table assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2A:
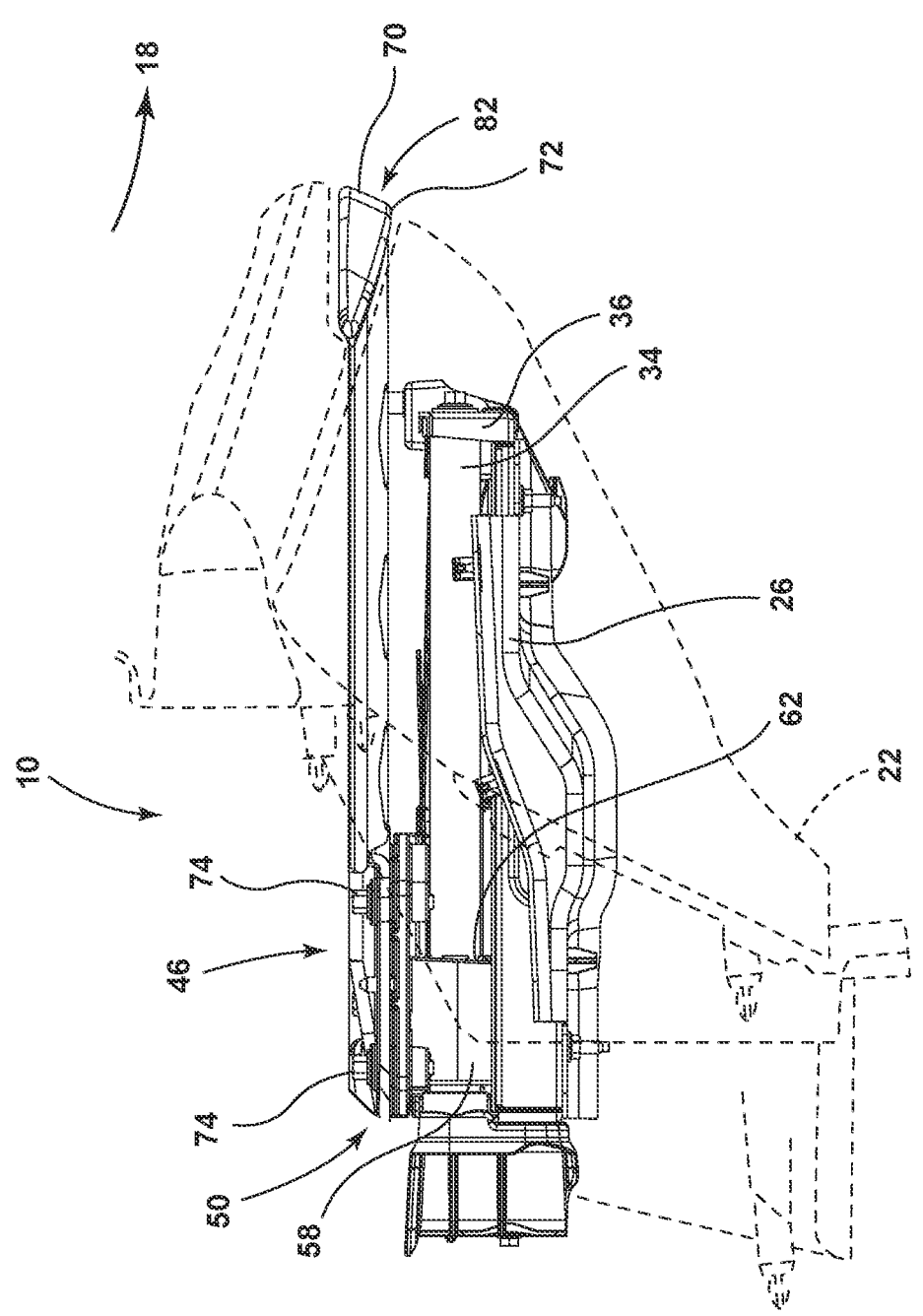
FIG. 2A is side elevation view of a tray table assembly in a holstered position.
Figure 2B:
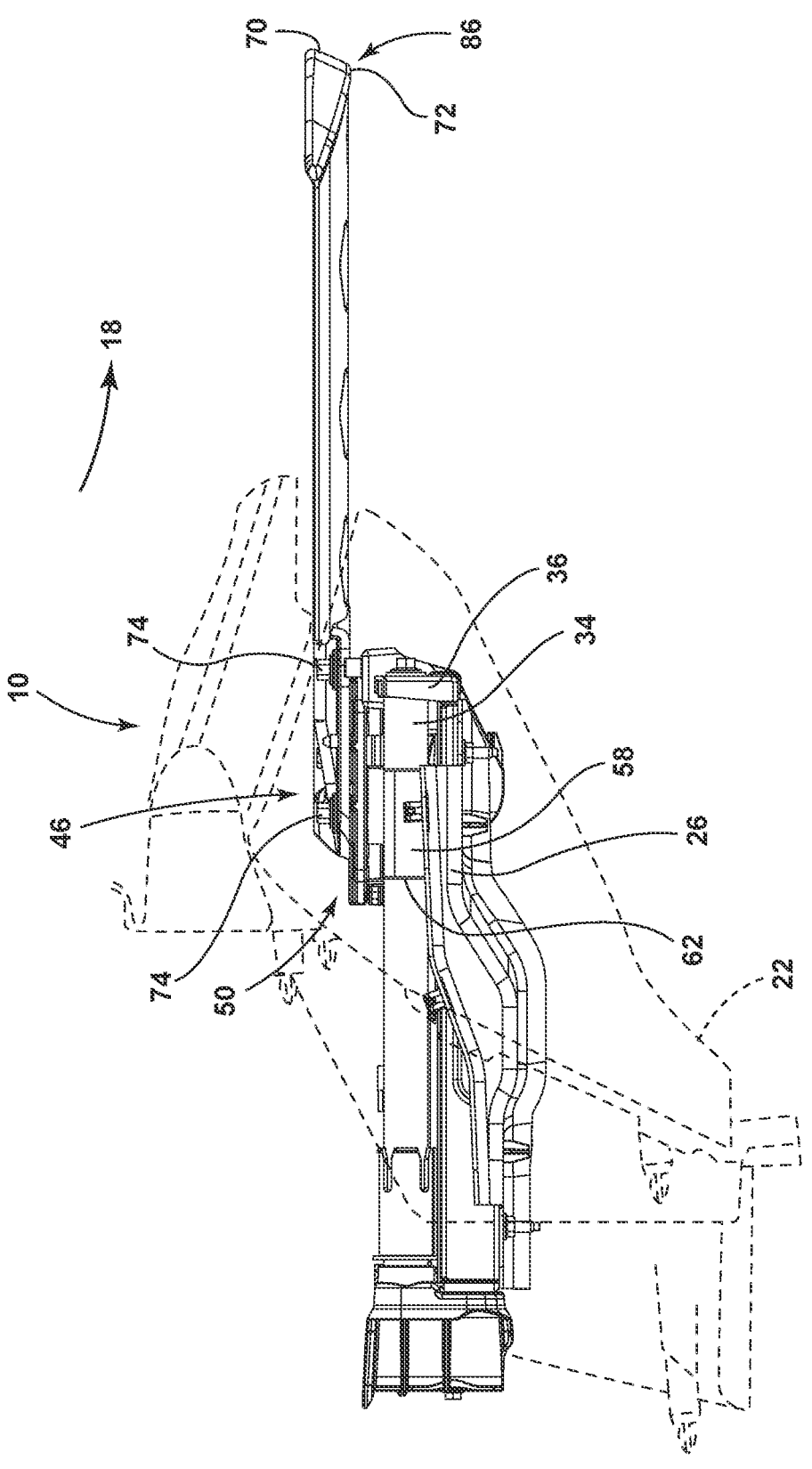
FIG. 2B is side elevation view of the tray table assembly in a deployed position.

With reference to FIG. 1, a motor vehicle 14 defines an interior cabin 18 generally configured with seating assemblies to accommodate a driver and passenger. The vehicle 14 includes an instrument panel 22 located forward of a front row of seating in the interior cabin 18 of the vehicle 14. The instrument panel 22 faces the interior cabin 18 such that a driver, passenger, or general occupant of the vehicle 14 can interact with the instrument panel 22. The vehicle 14 further includes a tray table assembly 10 coupled with the instrument panel 22. The tray table assembly 10 includes a tray 70. As illustrated in FIGS. 2A and 2B, a rear end 72 of the tray 70 may be at least partially visible from the interior cabin 18 while the tray 70 is in a holstered position 82. Additionally, or alternatively, the tray 70 of the tray table assembly 10 may be hidden while in the holstered position 82.

The tray table assembly 10 may be actuated from the holstered position 82 to the deployed position 86 and used in the deployed position 86 when the vehicle is stationary and not moving. In addition, the tray 70 of the tray table assembly 10 should not be in a position that would affect airbag performance.

With reference to FIGS. 2A and 2B, the tray table assembly 10 is illustrated unexposed to the interior cabin 18, except the tray 70 to some degree may be exposed at a rear end 72 of the tray 70. The tray table assembly 10 includes a base 26. The base 26 is coupled with the instrument panel 22. For example, the base 26 may be welded, fastened, or otherwise permanently attached with the instrument panel 22. The tray table assembly 10 includes a track 34 coupled with the base 26. For example, the track 34 may be coupled with the base 26 via a track mount 36 that is welded, fastened, or otherwise permanently attached to the base 26 and the track 34. The track 34 may be positioned above the base 26, as illustrated. Additionally, or alternatively, the track 34 may be positioned below, or adjacent to the base 26. The track 34 may take the form of, for example, an I-beam, a tube, or other elongated member. Therefore, the track 34 may be referred to as a tube in the example shown.

With additional reference to FIGS. 2A and 2B, the tray table assembly 10 includes a carrier mechanism 46. The carrier mechanism 46 includes a platform 50. The platform 50 is coupled with the tray 70 via a first plurality of fasteners 74. The carrier mechanism 46 includes a track receiver 58. The track receiver 58 is statically coupled with the platform 50. The track receiver 58 is slidably coupled with the track 34.

The track receiver 58 defines a track-receiving aperture 62. The track-receiving aperture 62 is configured to receive the track 34. The track-receiving aperture 62 is shaped and sized to be complementary of a cross-section of the track 34. Therefore, for example, if the track 34 is a circular tube, the track-receiving aperture 62 is a circle of similar size. In other words, the track-receiving aperture 62 circumscribes the track 34. Additionally, or alternatively, from the side perspective, the tray 70, the platform 50, and the base 26 extend generally parallel toward the interior cabin 18.

With specific reference to FIG. 2A, the carrier mechanism 46 is in the holstered position 82. Because the tray 70 is fastened with the platform 50 of the carrier mechanism 46, the tray 70 is also in the holstered position 82. The rear end 72 of the tray 70 may be substantially flush with the instrument panel 22 when the tray 70 is in the holstered position 82. The rear end 72 may be flared, as shown.

With specific reference to FIG. 2B, the carrier mechanism 46, and thus the tray 70 as well, are shown in a deployed position 86. The tray 70 may be coupled with the platform 50 distal the rear end 72 such that the tray 70 is cantilevered from the carrier mechanism 46. Additionally, or alternatively, the tray 70 in the deployed position 86 may extend more than about half a length of the tray 70 away from the instrument panel 22. Additionally, or alternatively, the tray 70 in the deployed position 86 may extend more than about two-thirds of the length of the tray 70 away from the instrument panel 22. Additionally, or alternatively, the tray 70 in the deployed position 86 may extend more than about three-fourths of the length of the tray 70 away from the instrument panel 22.

Figure 3:
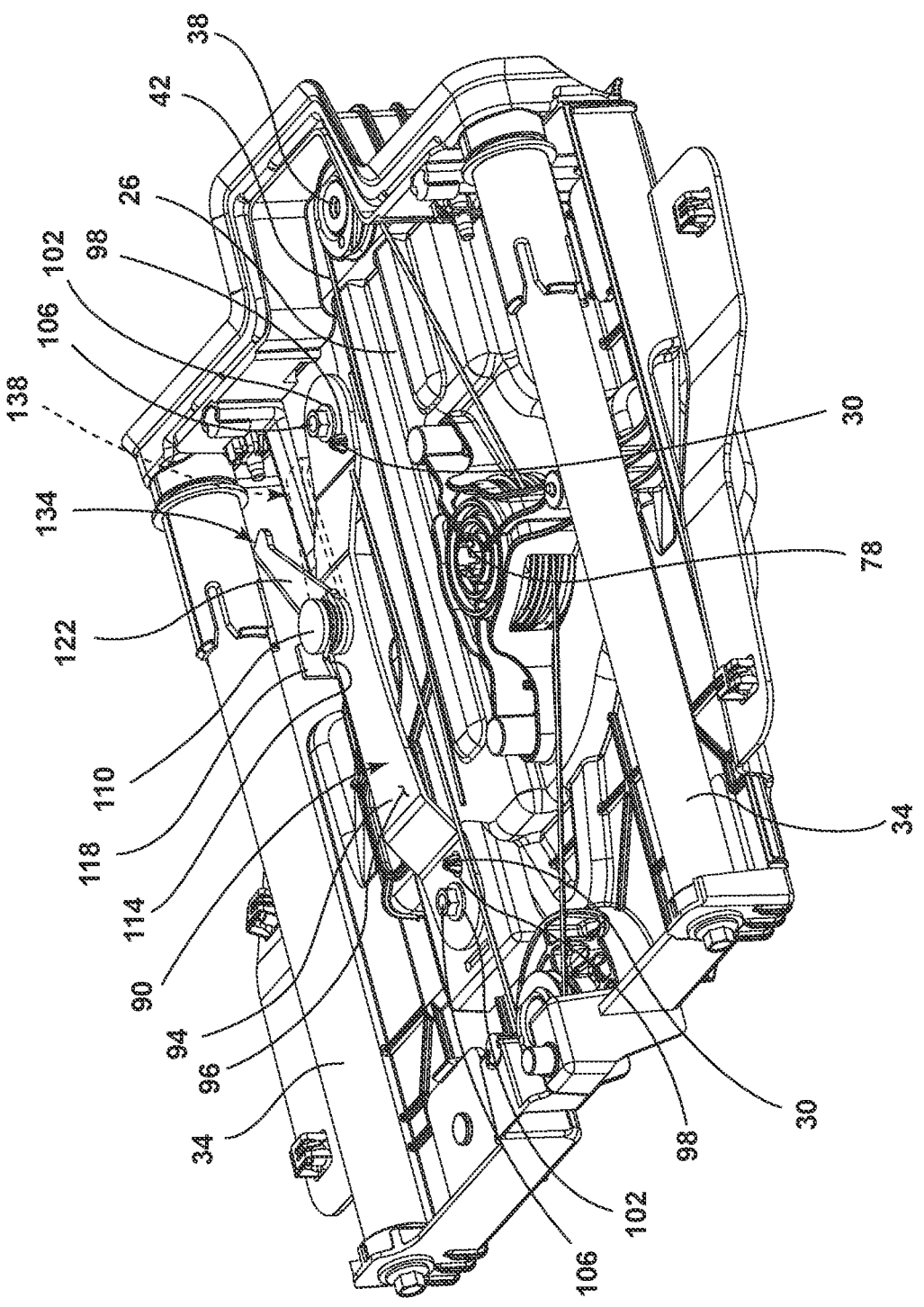
FIG. 3 is a partially exploded top perspective view of the tray table assembly.

With reference to FIG. 3, in addition to the elements described above, the tray table assembly 10 includes an actuator in the form of an electric motor 78. The motor 78 is coupled with the base 26. The motor 78 may, for example, be a pulley motor. The motor 78 may be coupled with a cable 42. The motor 78 is configured to drive the cable 42. The tray table assembly 10 may include at least one pulley 38. The at least one pulley 38 is slidably coupled with the cable 42, such that the cable 42 cycles around the pulley 38. The cable 42 is statically coupled with the carrier mechanism 46. More specifically, the cable 42 is statically coupled with the platform 50. Thus, the motor 78 activates to drive the cable 42, and the cable 42 translates the carrier mechanism 46 and the tray 70.

The tray table assembly 10 also includes at least one locator feature 30. The locator feature 30 may be unitarily coupled with the base 26, the locator feature 30 extending therefrom. Further, the locator feature 30 extends toward the carrier mechanism 46 (FIG. 4). The tray table assembly 10 includes a second plurality of fasteners 106 that is coupled with the base 26 proximal to the locator feature 30.

The tray table assembly 10 further includes a latch assembly 90 coupled with the base 26 via the second plurality of fasteners 106. The latch assembly 90 includes a bracket 94. The bracket 94 defines a first set of apertures 98 configured to receive the at least one locator feature 30. The locator feature 30 promotes proper placement of the latch assembly 90 during manufacture of the tray table assembly 10. The bracket 94 also defines a second set of apertures 102 configured to receive the second plurality of fasteners 106. Thus, the latch assembly 90 is specifically coupled with the base 26 because the bracket 94 is fastened to the base 26 via the second plurality of fasteners 106. The bracket 94 includes a raised surface 96, such that the first set of apertures 98 and the second set of apertures 102 are lower than the raised surface 96 of the bracket 94. The bracket 94 may slope away from the base 26 to define the raised surface 96.

With further reference to FIG. 3, the latch assembly 90 includes a multi-tiered rivet 110 coupled with the bracket 94 at the raised surface 96, such that the multi-tiered rivet 110 is further from the base 26 than the first set of apertures 98 and the second set of apertures 102. The latch assembly 90 includes a biasing member 114 coupled with the multi-tiered rivet 110. The biasing member 114 may, for example, include a spring, as shown. The latch assembly 90 includes a flange 118. The flange 118 may be unitarily coupled with the bracket 94 at the raised surface 96. The flange 118 and the multi-tiered rivet 110 may similarly extend away from the raised surface 96 toward the carrier mechanism 46 (FIG. 4). The biasing member 114 is also coupled with the flange 118. Additionally, or alternatively, the flange 118 is proximal to the multi-tiered rivet 110.

The latch assembly 90 includes a latch 122 that is coupled with the multi-tiered rivet 110. The latch 122 moves, or rotates for example, about the multi-tiered rivet between an open position 134 and a closed position 138. The latch 122 is also coupled with the biasing member 114, such that the latch 122 is biased toward the closed position 138, thus, the closed position 138 may also be referred to as the biased-closed position. For example, the biasing member 114 may be coupled with the latch 122 by being partially inserted into the latch 122, welded, fastened, or otherwise permanently attached to the latch 122.

Figure 4A:
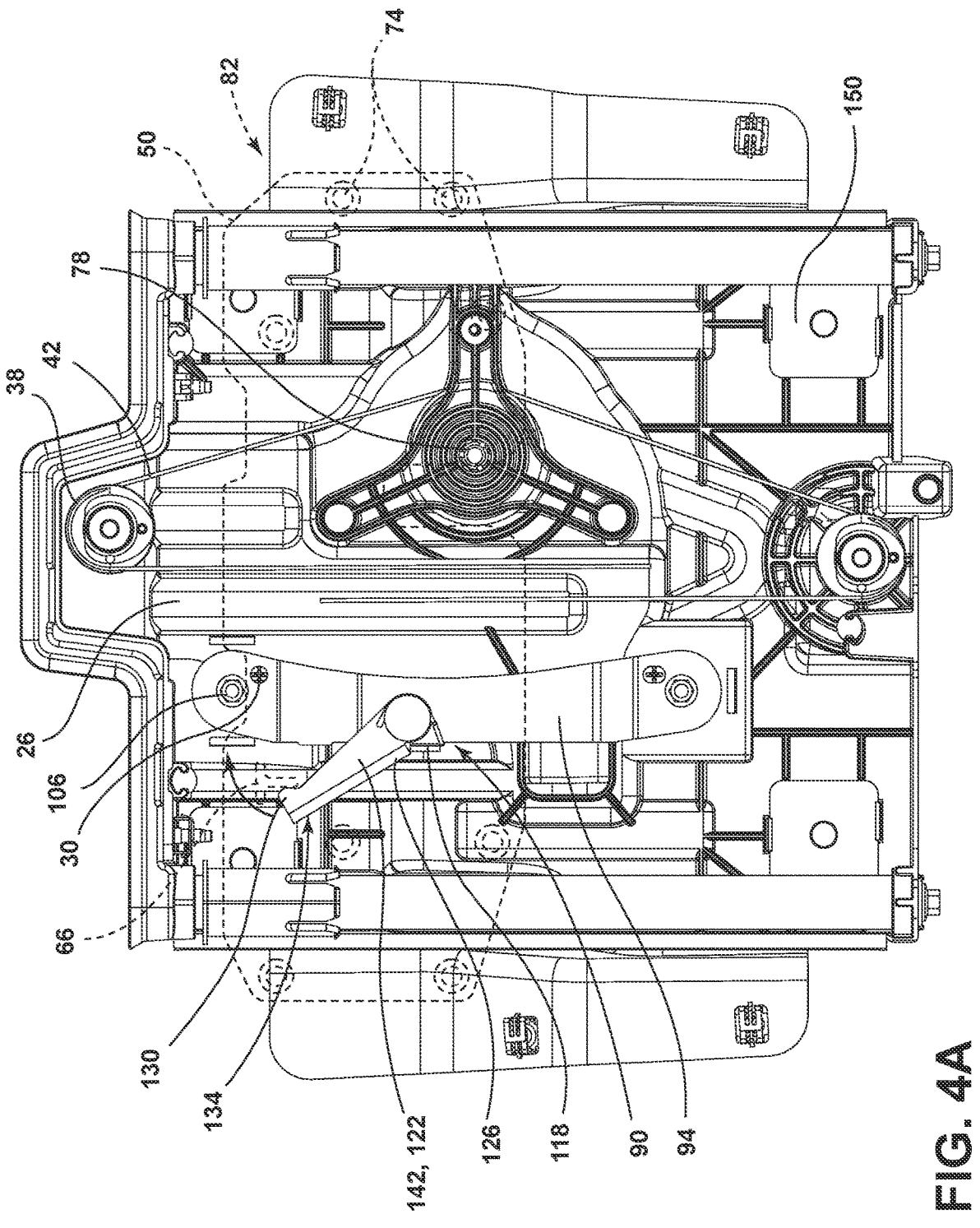
FIG. 4A is a plan view of the tray table assembly having a latch in a closed position.
Figure 6A:
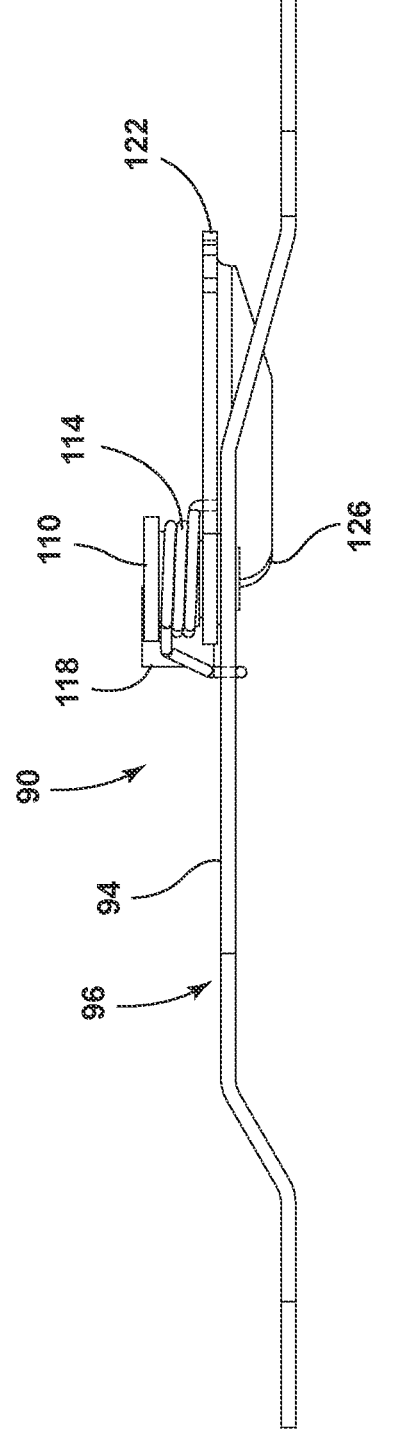
FIG. 6A is a side elevation view of the latch assembly.
Figure 6B:
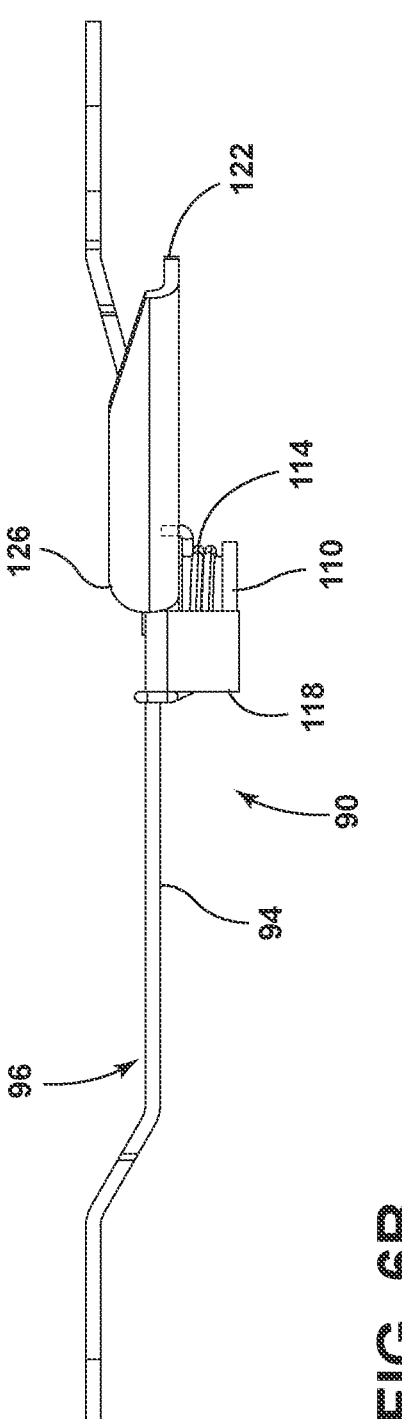
FIG. 6B is a side elevation view of the latch assembly.

With reference to FIG. 4A, in addition to the elements described above, the latch 122 includes a body 142. The latch 122 includes a hook 130 coupled with the body 142. Additionally, or alternatively, the hook 130 may be unitarily coupled with the body 142. The hook 130 extends from the body 142 toward the bracket 94 from the top perspective. The latch 122 includes a stopper 126 coupled with the body 142. Additionally, or alternatively, the stopper 126 may be unitarily coupled with the body 142. The stopper 126 extends from the body 142 away from the bracket 94 from the top perspective. Additionally, or alternatively, the stopper 126 extends from the body 142 toward the base 26 (best shown in FIG. 6A).

With further reference to FIG. 4A, the tray table assembly 10 includes a post 66. The post 66 is coupled with platform 50. Additionally, or alternatively, the post 66 is unitarily coupled with the platform 50. The post 66 extends from the platform 50 toward the base 26. As shown, the latch 122 is in the open position 134. In the open position 134, the hook 130 of the latch 122 engages the post 66 when the carrier mechanism 46 (and thus platform 50) is in the holstered position 82. Thus, the platform 50 and the elements statically coupled with the platform 50, including the tray 70, the carrier mechanism 46, the first plurality of fasteners 74, the cable 42, and the track receiver 58 are locked in the holstered position 82. Therefore, the latch 122 selectively engages the post 66.

Figure 4B:
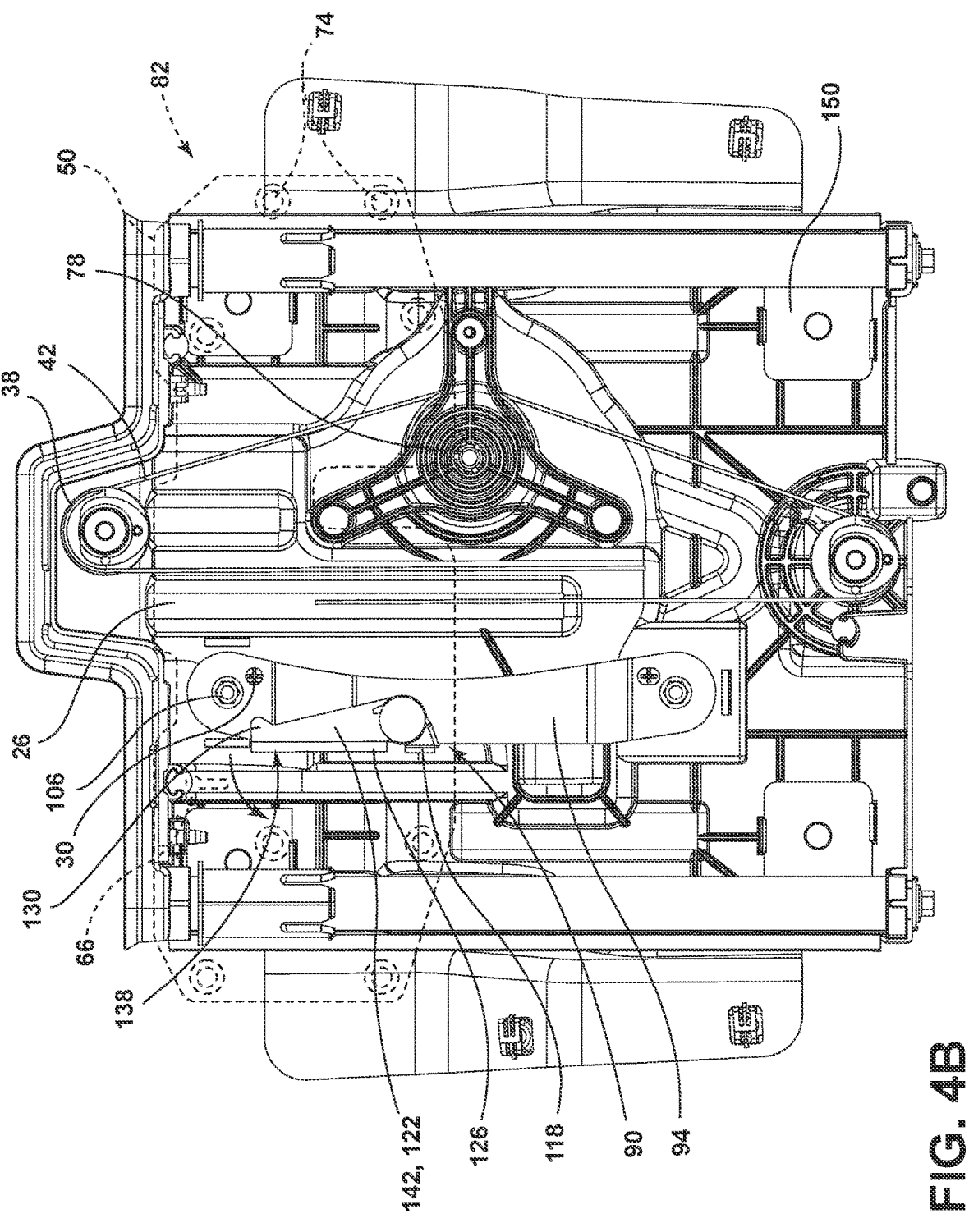
FIG. 4B is plan view of the tray table assembly having the latch in an open position.

With reference to FIG. 4B, the latch 122 is in the closed position 138. When the latch 122 is in the closed position

138, the post 66 is spaced from the latch 122 and specifically the hook 130. When the latch 122 is in the closed position 138, the post 66 is free to translate along with the platform 50 and the elements statically coupled with the platform 50, including the tray 70, the carrier mechanism 46, the first plurality of fasteners 74, and the track receiver 58, and the cable 42 is free to be driven by the motor 78. Additionally, or alternatively, a reinforcement plate 150 is coupled with the base 26 to provide rigidity to the base 26.

Figures 5A, 5B:
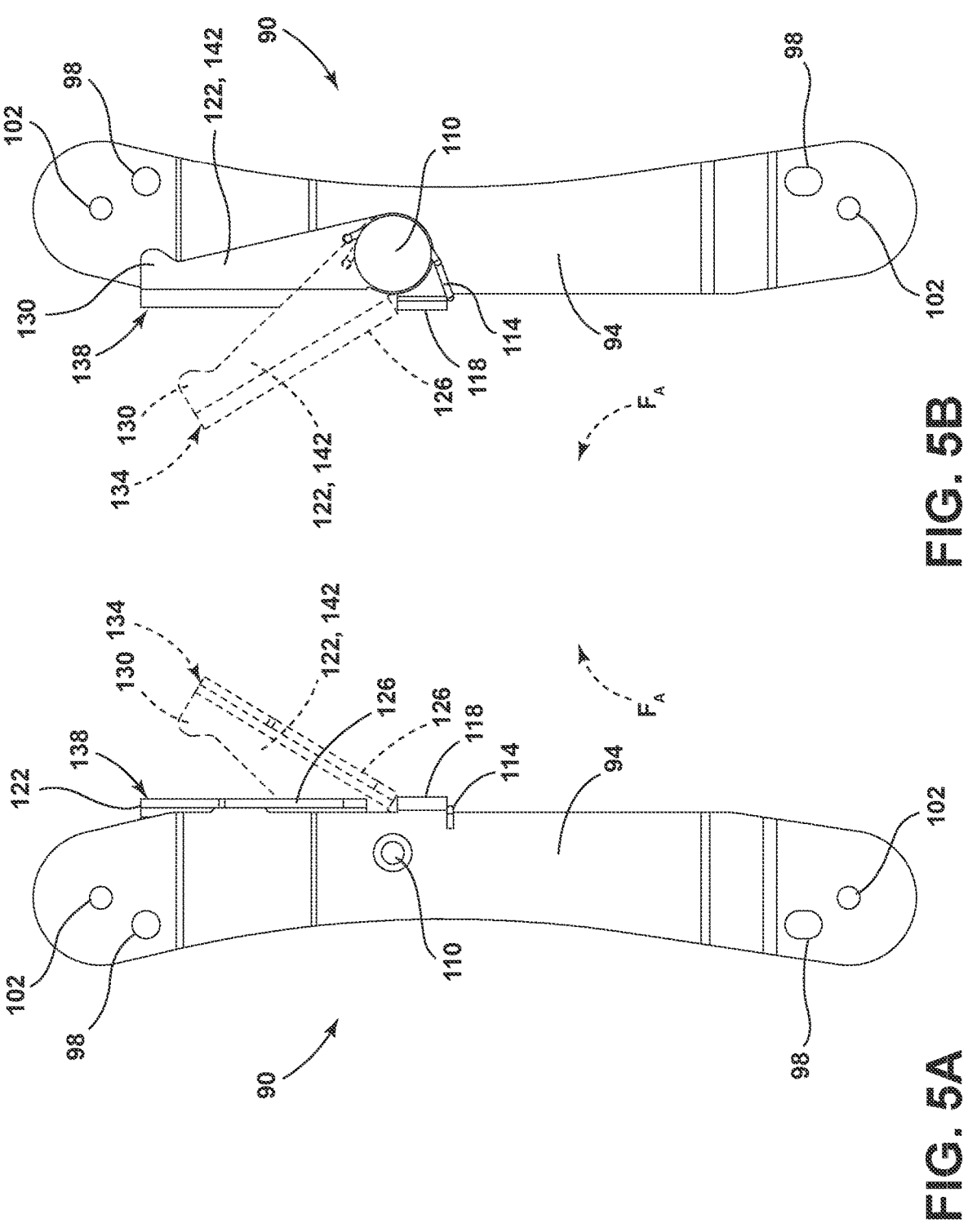
FIG. 5A is a bottom perspective view of a latch assembly.
FIG. 5B is a top perspective view of the latch assembly.

With reference to FIGS. 5A-5B, when an applied force, FA is greater than a target force (not shown), the latch 122 rotates about the multi-tiered rivet 110 from the closed position 138 to the open position 134. Therefore, the latch 122 is rotatably coupled with the multi-tiered rivet 110. Based on Hooke's Law (F=kx) the biasing member 114 may take the form of a spring with a spring constant, k, that is equal to the target force divided by the distance the biasing member 114 must deform for the latch 122 to rotate from the closed position 138 to the open position 134, x. In other words, k=(target force)/(deformation of the biasing member 114 between the open position 134 and the closed position 138). Therefore, when the applied force FA is greater than or equal to the target force, the latch 122 rotates to the open position 134 and the post 66 (FIG. 4A) engages the hook 130 of the latch 122 to lock the carrier mechanism 46 in the holstered position 82. The applied force FA that is less than the target force, will not rotate the latch 122 into the open position 134. In other words, the latch 122 rotates to the open position 134 in response to the applied force FA being greater than or equal to the target force.

With further reference to FIGS. 5A and 5B, the target force may result from a deceleration of about 5 g to about 10 g, according to one example; from about 6 g to about 9 g, according to another example; or from about 7 g to about 8 g, according to a further example.

With reference to FIGS. 5A-6B, the stopper 126 engages the flange 118 when the latch 122 is in the open position 134. The stopper 126 that engages the flange 118 prevents the latch 122 from over-rotating when the applied force FA is greater than the target force. The stopper 126 engages the bracket 94 when the latch 122 is in the closed position 138. The stopper 126 that engages the bracket 94 allows the latch 122 to remain parallel with the bracket 94 from the top perspective. The raised surface 96 of the bracket 94 is spaced from the base 26 such that the stopper 126 remains spaced from the base 26 even when the latch assembly 90 is coupled with the base 26.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A tray table assembly for a vehicle, the tray table assembly comprising:
   a base;
   a track coupled with the base;
   a carrier mechanism slidably coupled with the track, the carrier mechanism including;
      a platform coupled with the track; and
      a post coupled with the platform;
   a tray coupled with the platform;
   a motor coupled with the base, the motor configured to translate the carrier mechanism along the track between a holstered position and a deployed position; and a latch assembly coupled with the base, the latch assembly including:
a bracket coupled with the base;
a multi-tiered rivet coupled with the bracket;
a biasing member coupled with the multi-tiered rivet; and
a latch coupled with the multi-tiered rivet and the biasing member, wherein the biasing member is configured to bias the latch toward a biased-closed position and the latch moves from the biased-closed position to an open position in response to an applied force above a target force, and wherein the latch in the open position selectively engages the post to lock the carrier mechanism in the holstered position.

2. The tray table assembly of claim 1, wherein the latch assembly further includes a flange unitarily coupled with the bracket, the flange engaged with the biasing member, the flange selectively engaged with the latch.

3. The tray table assembly of claim 2, wherein the latch further includes:
a body coupled with the multi-tiered rivet;
a hook unitarily coupled with the body, the hook selectively engaged with the post; and
a stopper unitarily coupled with the body, the stopper selectively engaged with the flange when the latch is in the open position.

4. The tray table assembly of claim 3, wherein the multi-tiered rivet and the flange extend from the bracket toward the carrier mechanism.

5. The tray table assembly of claim 4, wherein the stopper extends from the body toward the base.

6. The tray table assembly of claim 5, wherein the body extends from the multi-tiered rivet toward the post of the carrier mechanism in the holstered position.

7. The tray table assembly of claim 1, wherein the target force is about 6 g.

8. The tray table assembly of claim 1, wherein the carrier mechanism includes a track receiver coupled with the platform, the track receiver defining a track-receiving aperture configured to receive the track.

9. The tray table assembly of claim 1 further including a reinforcement plate coupled with the base.

10. The tray table assembly of claim 1 further including:
a pulley coupled with the base; and
a cable slidably coupled with the pulley, the cable coupled with the motor, the cable statically coupled with the platform, wherein the motor translates the carrier mechanism by driving the cable.

11. The tray table assembly of claim 1, wherein the track includes a tube, and wherein the carrier mechanism circumscribes the tube.

12. A tray table assembly comprising:
a base having at least one locator feature extending therefrom;
at least one track coupled with the base;
a carrier mechanism slidably coupled with the at least one track, the carrier mechanism including:
a platform including at least one track receiver, the at least one track receiver coupled with the at least one track; and
a post extending from the platform toward the base;
a tray coupled with the platform;
a motor coupled with the base, the motor configured to translate the carrier mechanism from a holstered position to a deployed position; and
a latch assembly coupled with the base, the latch assembly including:

a bracket coupled with the base at the locator feature;
a multi-tiered rivet coupled with the bracket;
a biasing member coupled with the multi-tiered rivet; and
a latch coupled to the multi-tiered rivet, the latch coupled with the biasing member, wherein the biasing member biases the latch toward a closed position, wherein the latch moves toward an open position in response to an applied force greater than a target force, and wherein the latch in the open position selectively engages the post to lock the carrier mechanism in the holstered position.

13. The tray table assembly of claim 12, the latch assembly further including a flange extending from the bracket proximal to the multi-tiered rivet, wherein the biasing member is coupled with the flange.

14. The tray table assembly of claim 13, the latch further including:
a body coupled with the multi-tiered rivet, the body extending therefrom;
a hook extending from the body distal from the multi-tiered rivet, the hook selectively engaged with post of the carrier mechanism in the holstered position when the latch is in the open position; and
a stopper configured to engage the flange when the latch is in the open position.

15. The tray table assembly of claim 12, wherein the target force ranges from about 6 g to about 10 g.

16. The tray table assembly of claim 12, wherein the tray is coupled with the platform via a first plurality of fasteners.

17. The tray table assembly of claim 16, the bracket defining:
a first set of apertures configured to receive the at least one locator feature; and
a second set of apertures configured to receive a second plurality of fasteners to couple the bracket with the base.

18. The tray table assembly of claim 12, wherein the bracket slopes away from the base such that the multi-tiered rivet is spaced from the base.

19. A vehicle comprising:
an instrument panel facing an interior cabin defined by the vehicle;
a tray table assembly coupled with the instrument panel, the tray table assembly including:
a base coupled with the instrument panel, the base including a plurality of locator features extending away from the base;
a plurality of tracks coupled with the base;
a plurality of pulleys coupled with the base;
a cable coupled with the plurality of pulleys;
a carrier mechanism slidably coupled with the plurality of tracks, the carrier mechanism including:
a platform coupled with the cable;
a plurality of track receivers coupled with the platform, the plurality of track receivers defining a plurality of track-receiving apertures; and
a post extending from the platform toward the base;
a tray coupled with the platform via a first plurality of fasteners;
a motor coupled with the base, the motor coupled with the cable, the motor configured to translate the carrier mechanism between a holstered position and a deployed position by driving the cable; and
a latch assembly coupled with the base, the latch assembly including:
a bracket defining:

a first set of apertures configured to receive the plurality of locator features; and a second set of apertures configured to receive a second plurality of fasteners, wherein the second plurality of fasteners coupled the bracket with the base;

a multi-tiered rivet coupled with the bracket;

a biasing member coupled with the multi-tiered rivet;

a flange unitarily coupled with the bracket; and a latch having a stopper, the latch coupled to the multi-tiered rivet, the latch coupled with the biasing member, wherein the biasing member biases the latch toward a closed position, wherein the latch moves toward an open position in response to an applied force greater than a target force, wherein the stopper of the latch in the open position engages the flange, and wherein the latch in the open position selectively engages the post to lock the carrier mechanism in the holstered position.

20. The vehicle of claim 19, the latch further including:

a body coupled with the multi-tiered rivet, the body extending therefrom; and a hook extending from the body distal from the multi-tiered rivet, the hook selectively engaged with post of the carrier mechanism in the holstered position when the latch is in the open position, wherein the stopper is proximal to the multi-tiered rivet, and wherein the stopper is distal from the hook.

* * * * *